Mar. 20, 1923.
J. W. CRAWLEY
AUTOMOBILE SIGNAL
Filed Dec. 27, 1921
1,448,913
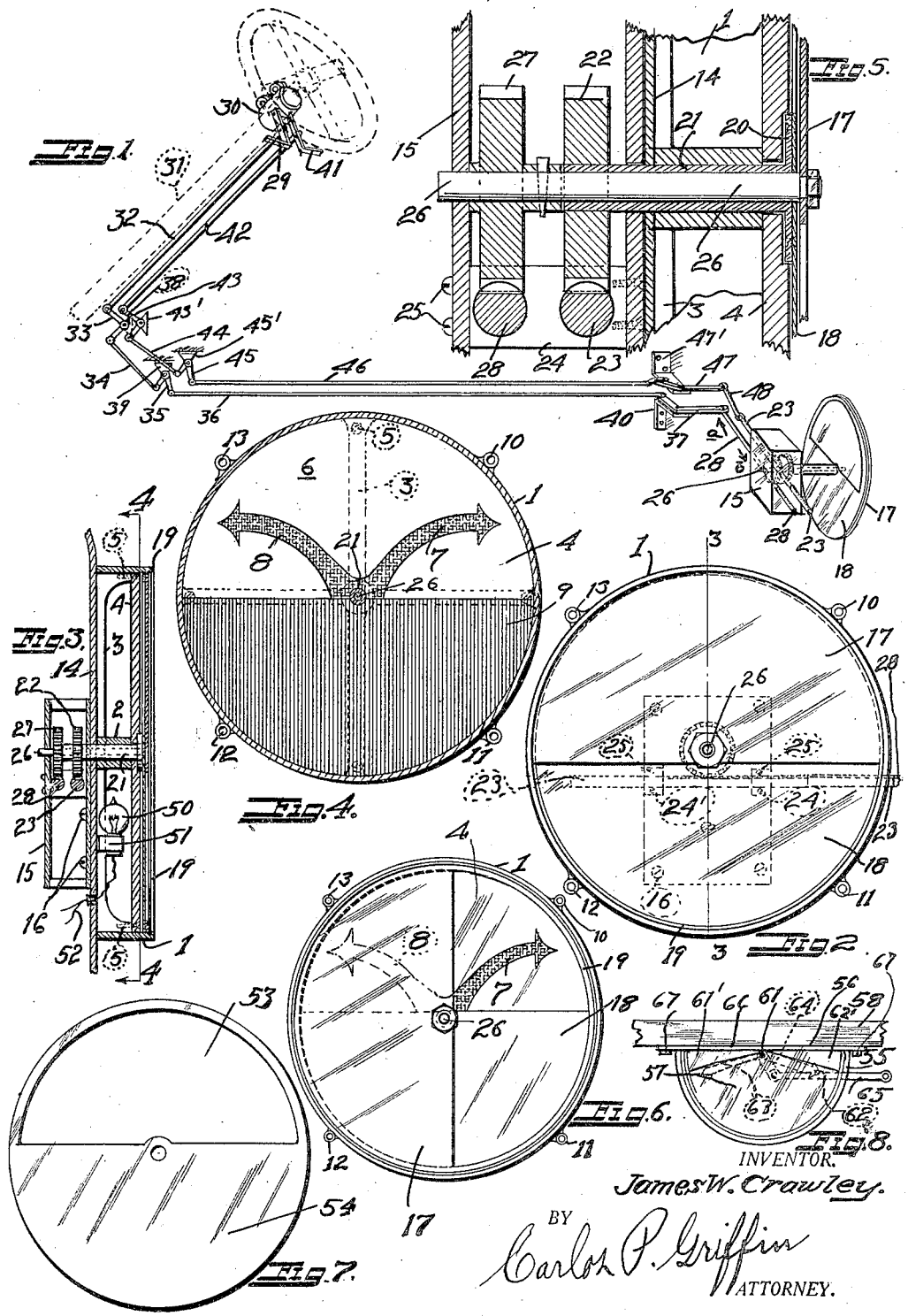
INVENTOR.
James W. Crawley.
BY
Carlos P. Griffin
ATTORNEY.

Patented Mar. 20, 1923.

1,448,913

UNITED STATES PATENT OFFICE.

JAMES W. CRAWLEY, OF ALAMEDA, CALIFORNIA.

AUTOMOBILE SIGNAL.

Application filed December 27, 1921. Serial No. 524,318.

*To all whom it may concern:*

Be it known that I, JAMES W. CRAWLEY, a citizen of the United States, residing at Alameda, in the county of Alameda, State of California, have invented a new and useful Automobile Signal, of which the following is a specification in such full and clear terms as will enable those skilled in the art to construct and use the same.

This invention relates to improvements in signals for use on automobiles and other motor vehicles to indicate to the drivers of following and passing vehicles any intended change in the movement thereof, and the object of the present invention is to provide a signal that can be seen day or night from a considerable distance and make a vivid impression whereby the intended change of movement of a driver will be clear to any driver following or approaching.

Another object is to make a signal that is easily operated and of simple construction with few wearing parts.

Another object is to construct a signal that can be readily attached to the fender or other convenient part of an automobile.

Other objects of the invention will appear as the description proceeds.

An embodiment of the invention is shown in the accompanying drawings in which the same reference numeral is applied to the same portion throughout, but I am aware that there may be modifications thereof.

Fig. 1 is a perspective view showing means for operating the signal from the steering wheel of an automobile.

Fig. 2 is a front view of the signal.

Fig. 3 is a section on the line 3—3 of Figure 2.

Fig. 4 is a section on the line 4—4 of Figure 3.

Fig. 5 is an enlarged section of a portion of the means for turning the shutters.

Fig. 6 is a face view of the signal showing a shutter turned to expose a right hand arrow.

Fig. 7 is a view of one of the rotary shutters, and

Fig. 8 is a face view of a modified form of the signal adapted to be mounted on the front portion of a vehicle.

The numeral 1 indicates the casing of the signal mechanism with a hub 2 and spokes 3 to which is attached the plate 4 by means of screws 5. The plate 4 is made preferably of glass with the portion 6 made opaque, and the right and left arrows 7 and 8 and the lower half portion 9 being transparent, the portion 9 being colored red, and the arrows 7 and 8 being in this instance colored yellow.

Lugs with holes 10 to 13 inclusive are provided for attaching the casing to a fender 14, a portion of which is shown in Figure 2. On the inside of the fender is the frame 15 attached thereto by suitable screws 16, and in which is mounted the operating means for displaying the signals.

The signal characters are stationary on the plate 4 and are normally covered by the rotary shutters 17 and 18 which are preferably of thin sheet metal, the shutter 18 lying flat on the plate 4 and the shutter 17 lying flat on the shutter 18 with the outer edge held in place by a suitable spring wire 19 which fits into an annular groove in the rim of the casing 1.

The rotary shutter 18 is attached to the flange 20 of the sleeve 21, which is revoluble in the hub 2, and extends into the frame 15. A gear 22 is fixed on the end of the sleeve and is in mesh with a sliding rack 23 which has bearings 24 and 24' held in place by screws 25 in the frame 15.

The shutter 17 is fixed to a shaft 26 and is adapted to turn in the sleeve 21, and has the gear 27 fixed thereto and in mesh with the rack 28 which is slidable in the bearings 24 and 24'. By sliding the racks the shutters are caused to rotate right or left as desired.

A method of operating the shutters is shown in Figure 1. It consists of a system of bell cranks and connecting rods mounted on suitable brackets. The rack 28 is reciprocated by means of a lever 29 pivoted on a bracket 30 on the steering post 31 and acting on the rod 32, the bell crank 33, the rod 34, the bell crank 35, the rod 36, the bell crank 37 which is connected to the rack 28 which turns the gear 27 and the shaft 26 and with it the shutter 17. Brackets 38, 39 and 40 are fixed to the vehicle frame and support the bell cranks which are pivoted thereon.

The shutter 18 is turned by means of the lever 41 pivoted on the bracket 30, the rod 42, the bell crank 43, the rod 44, the bell crank 45, the rod 46, the bell crank 47, the rod 48 which connects to the rack 23 and turns the gear 22 and the shutter through the sleeve 21. Brackets 43', 45' and 47' support the bell cranks.

The shutter 17 is designed to turn from the normal position about ninety degrees to the left to expose the right hand pointing arrow 7, or about ninety degrees to the right to expose the left hand pointing arrow 8.

The shutter 18 can be turned in either direction about one hundred and eighty degrees to expose the portion 9, which is the red or stop signal. A lamp 50 is mounted on a bracket 51 in the casing, wires 52 lead to a suitable switch near the driver of the vehicle and thence to the lighting circuit.

The shutters 17 and 18 are duplicates, one of which is shown in Figure 7, and are made of thin material and have the cut out portion 53 to expose the signals, and the solid portion 54 to cover the signals in the normal position.

The modified form shown in Figure 8 is designed to be attached to the front part of an automobile and to work in conjunction with the rear signals above described, the casing 55 being approximately half round with a flat surface 56 adapted to fit on the underside of a bar 58 which joins the front springs, or under the radiator or on some automobiles on the underside of the front axle. The shutter 57 is pivoted on the shaft 61 and has the cut out portion 61' and 62' which allows it to swing far enough to right or left to expose the right or left arrows 62, 63. These arrows may be transparent and colored and have a means of illumination such as an electric lamp mounted in the casing. The shutter can be operated by a short crank 64 and a rod 65, and connected to the operating handle 29 shown in Figure 1 by means of suitable bell cranks and rods which are not shown. A flange 66 on the casing allows for attaching by means of the bolts 67.

In operating, if the driver intends to turn to the right he will pull up on the handle 29 which will cause the rack 28 to move in the direction of the arrow $a$ and turn the shutter 17 to the left exposing the arrow 7 pointing to the right, but if he wanted to turn to the left he would push down on the handle 29 and cause the rack 28 to move in the direction of the arrow $b$ which would turn the shutter 17 to the right exposing the left hand pointing arrow 8. If the driver intends to slow up or stop, he will push or pull on the lever 41 which will move the rack 23 and cause the shutter 18 to move and expose the stop signal represented by the portion 9 on the plate 4. The throw of the levers 29 and 41 may be limited to a predetermined movement to cause the required rotation of the shutters.

What I claim is as follows, but various modifications may be made in the construction shown in the drawings and above particularly described form, within the purview of my invention.

1. An automobile signal comprising a casing, a plate fixed in said casing, a pair of shutters revoluble on said plate, one of said shutters being adapted to cover the upper portion of said plate and the other shutter adapted to cover the lower portion of said plate, right and left indicating signals on the said upper portion of said plate, and a stop indicating signal on the lower portion of said plate, and means for moving said shutters to expose any one of said signals at will.

2. An automobile signal comprising a casing, a plate fixed in said casing, a pair of revoluble shutters mounted on said plate, one of said shutters fixed to a sleeve extending through said plate and having a bearing in said casing, a gear fixed on said sleeve, a rack in mesh with said gear, the other of said shutters being fixed to a shaft extending through said sleeve, a gear on said shaft in mesh with a rack, right and left direction and stop signals on said plate normally covered by said shutters, and means for operating said rack to revolve said shutters to uncover any one of said signals at will.

3. An automobile signal comprising a casing, a plate fixed in said casing, a pair of shutters revoluble on said plate, one of said shutters adapted to cover the upper portion of said plate and the other shutter adapted to cover the lower portion of said plate, transparent colored right and left direction signals on the upper portion of said plate, and a transparent colored stop indicating signal on the lower portion of said plate, a lamp mounted in said casing behind said plate adapted to illuminate said signals, and means for moving said shutters to expose any one of said signals at will.

In testimony whereof I have hereunto set my hand this 16th day of December, A. D. 1921.

JAMES W. CRAWLEY.